United States Patent [19]
Lee et al.

[11] Patent Number: 6,080,815
[45] Date of Patent: Jun. 27, 2000

[54] PROCESS FOR PRODUCING THERMOPLASTIC RESINS HAVING HIGH IMPACT STRENGTH

[75] Inventors: Chang-Hong Lee; Young-Min Kim; Jin-Nyoung Yoo, all of Deajeon, Rep. of Korea

[73] Assignee: LG Chemical Limited, Rep. of Korea

[21] Appl. No.: 09/091,254

[22] PCT Filed: Nov. 4, 1997

[86] PCT No.: PCT/KR97/00213

§ 371 Date: Jun. 10, 1998

§ 102(e) Date: Jun. 10, 1998

[87] PCT Pub. No.: WO98/20057

PCT Pub. Date: May 14, 1998

[30] Foreign Application Priority Data

Apr. 11, 1996 [KR] Rep. of Korea ...................... 96-51875

[51] Int. Cl.[7] .................................................. C08F 279/04
[52] U.S. Cl. ................................ 525/66; 525/71; 525/73; 525/84; 525/246; 525/316; 524/504; 523/335
[58] Field of Search ................................ 525/66, 71, 73, 525/84, 86; 524/504; 523/335

[56] References Cited

U.S. PATENT DOCUMENTS

| | | | |
|---|---|---|---|
| 3,624,183 | 11/1971 | Leach et al. | 525/86 |
| 4,107,234 | 8/1978 | Cornell | 260/876 R |
| 5,200,441 | 4/1993 | Kim et al. | 523/221 |
| 5,225,494 | 7/1993 | Ishiga | 525/316 |

FOREIGN PATENT DOCUMENTS

| | | | |
|---|---|---|---|
| 0 360 074 | of 1990 | European Pat. Off. | C08F 279/04 |
| 3640337 | of 1988 | Germany | C08F 279/02 |
| 2-247245 | 10/1990 | Japan . | |
| 1 469 302 | 4/1977 | United Kingdom | C08F 2/22 |

OTHER PUBLICATIONS

ESP@cenet–Document Bibliography and Abstract for Japanese Patent Publication No. 2–247245, Oct. 1990 (1 page).
International Search Report for International Application No. PCT/KR 97/00213.

*Primary Examiner*—James J. Seidleck
*Assistant Examiner*—Olga Asinovsky
*Attorney, Agent, or Firm*—Senniger, Powers, Leavitt & Roedel

[57] ABSTRACT

The present invention relates to a process for producing a thermoplastic resin having high impact strength and good surface gloss, which comprises graft copolymerizing at least a vinyl cyanide compound and at least an aromatic vinyl compound for a short period of less than about 3 hours in the presence of rubber latex having high gel content. The rubber latex can be a mixture of two or more rubber latices having different particle size. The graft copolymer has the characteristics such that the degree of the inner occlusion into the resin is decreased and the degree of surface grafting is increased. Thereby, the resulted thermoplastic resin has a very high impact strength and good surface gloss, and the processability is greatly improved. In addition, when the graft copolymer is polymerized the level of coagulum formation is greatly decreased.

11 Claims, No Drawings

PROCESS FOR PRODUCING THERMOPLASTIC RESINS HAVING HIGH IMPACT STRENGTH

TECHNICAL FIELD

The present invention relates to a process for producing thermoplastic resins having high impact strength and good surface gloss. In particular, the present invention relates to a process for the fast production of thermoplastic resins having high impact strength and good surface gloss, characterized in that the process comprises graft copolymerizing a vinyl cinanide compound and an aromatic vinyl compound for less than 3 hours in the presence of a rubber latex having more than 90% of gel content. The rubber latex can be a mixture of two or more rubber lattices having different particle size.

BACKGROUND ART

It is well known in this art that, in order to improve the impact strength of thermoplastic resins such as ABS type resin or the similar resins, in the preparation thereof, thermoplastic resins such as styrene-acrylonitrile copolymer, polystyrene, polymethyl methacrylate and the like are blended with a graft copolymer. This graft copolymer is prepared by graft copolymerizing rubber latex, that is, diene-type rubber lattices such as polybutadiene, styrene-butadiene copolymer, acrylonitrile-butadiene copolymer and the like.

In the U.S. Pat. Nos. 3,509,238 and 4,520,165, the use of water soluble potassium persulphate initiator is described, and the total reaction time is approximately 6 hours. U.S. Pat. No. 4,009,227 describes the use of water soluble initiator and polybutadiene rubber latex having relatively higher gel content of 85%.

However, the resulted thermoplastic resin has relatively lower impact strength, and the total reaction time is more than four hours.

Additionally, U.S. Pat. Nos. 3,928,494, 4,753,988, 4,668,738 and GB 1,501,256 have all disclosed the use of water-soluble initiator.

In these disclosures, however, the total reaction time is more than 5 hours, and the gel content of the used rubber lattices is not described.

In general, the graft polymerization as mentioned above is conducted via emulsion polymerization. It is well known in the art that the graft polymerization generally takes about 5 hours, and that shortening of said reaction time yields an insufficient degree of grafting which leads to lower dispersability when the graft polymer is blended with the thermoplastic resins. Therefore, the resulted thermoplastic resin composition has low impact strength, inferior surface gloss and poor processability due to their lower dispersability.

DISCLOSURE OF INVENTION

Thus, the object of the present invention is to provide a process for the fast production of a thermoplastic resin having high impact strength and good surface gloss without causing the above mentioned problems.

In order to achieve this object, the inventors have extensively studied and found that, if at least a vinyl cyanide compound and at least an aromatic vinyl compound are graft copolymerized for a short period of less than about 3 hours to a rubber latex having a gel content of more than 90% in the presence of a water-soluble initiator, the inner occlusion into the rubber and the level of coagulum formation are decreased, and a degree of rubber surface grafting is much increased. Thereby, the resulted thermoplastic resin has very high impact strength and good surface gloss. Furthermore, the productivity is greatly improved due to the short reaction time.

It is believed that the higher impact strength is largely due to the lower level of occlusion. This lower level of occlusion may cause easily rubber cavitation phenomena in fracture.

In addition, when a thermoplastic resin prepared according to the present invention is blended with other thermoplastic resins, the resulted resin composition also has higher impact strength and good surface gloss.

DETAILED DESCRIPTION OF THE INVENTION

Said rubber latex may be a mixture of small rubber latex and large rubber latex. Said small rubber latex can be prepared by conventional emulsion polymerization. The small rubber latex has a gel content of 90 to 100% and an average particle diameter of 0.07 to 0.15 $\mu$m. Said large rubber latex can be prepared by conventional emulsion polymerization or acid- or salt-coagulation of small rubber latex. The resulted large rubber latex has a gel content of 90 to 100% and an average particle diameter of 0.25 to 0.35 $\mu$m.

The present invention relates to a process for fast production of a thermoplastic resin having high impact strength and good surface gloss, characterized in that the process comprises graft copolymerizing, for less than 3 hours, 20 to 60% by weight of at least a vinyl cyanide compound and 40 to 80% by weight of at least an aromatic vinyl compound based on the total amount of monomers in the presence of 30 to 80% by weight of a rubber latex mixture comprising less than 20% by weight of the small rubber latex and 80 to 100% by weight of the large rubber latex by using a water-soluble initiator. The amount of the initiator is from 0.1 to 0.3 parts by weight, and the reaction temperature is around 60° C. to 70° C.

Examples of the rubber latex used in the present invention include polybutadiene or a copolymer of butadiene with at least a comonomer in which the content of butadiene is more than 50% by weight. In particular, the comonomer include aromatic vinyl compounds such as styrene, α-methylstyrene, vinyl toluene, tert-butyl styrene, etc., or vinyl cyanide compounds such as acrylonitrile, methacirylonitrile or the like.

The small rubber latex can be prepared by emulsion polymerization according to any conventional method known in the art. As for the large rubber latex, it can be prepared by conventional polymerization or acid agglomeration of said small rubber latex.

In the preparation of rubber latex, the particle diameter of rubber latex can be controlled by varying various parameters such as the amount of an emulsifier, the pH value, the reaction temperature, total solid content, or the like. This can be easily achieved by persons skilled in the art.

In addition, the rubber latex available from the market can also be used in the present invention, as long as they meet the requirements as stated above.

The thermoplastic resins of the present invention can be prepared by two separate processes including (A-1) the preparation of the small rubber latex and (A-2) the preparation of the large rubber latex, and (B) graft copolymerization.

Below, the process of the invention will be specifically described.

(A-1) Preparation of Small Rubber Latex:

When a small rubber latex having an average particle diameter from 0.07 to 0.15 μm is prepared using a conventional emulsion polymerization method, the obtained rubber latex has a gel content of more than 90% and a swelling index of less than 20.

In the present invention, a rubber latex having a gel content of more than 90% and a swelling index of less than 20 is prepared and used in order to reduce the possibility of occlusion into the rubber particles in the graft polymerization of step (B).

The determination of the swelling index and the gel content as defined in the present invention is conducted as follows:

The resulted rubber latex is coagulated, washed with water, and dried in a vacuum oven at the temperature of 40° C. for 24 hours. 1 g of the dried rubber latex is weighed and placed in 100 g of toluene for 48 hours to swell. After separating the soluble portion and the insoluble portion of the rubber, the weight of each portion is measured and the swelling index and the gel content are calculated according to the following equation:

$$\text{gel content (\%)} = \frac{\text{the weight of dried gel}}{\text{the weight of rubber}} \times 100$$

$$\text{swelling index} = \frac{\text{the weight of gel swollen in toluene}}{\text{the weight of the dried gel}} \times 100$$

(A-2) Preparation of Large Rubber Latex:

A large rubber latex can be prepared by using a small rubber latex. A large rubber latex having particle diameter of 0.25 to 0.35 μm used in the present invention is prepared by any conventional method known in the art, including acid agglomeration or emulsion polymerization.

In general, the particle diameter of the rubber latex can be controlled by varying various parameters such as the amount of an emulsifier, the pH value, the reaction temperature, the amount of electrolyte, the total solid content, and the like in accordance with many documents, so that the desired particle diameter of the rubber latex can be obtained easily by the person skilled in the art.

(B) Graft Copolymerization:

The thermoplastic resin having high impact strength and good surface gloss of the present invention can be prepared by graft polymerizing, for less than about 3 hours, a vinyl cyanide compound and an aromatic vinyl compound in the presence of rubber latex, using a water-soluble initiator.

The amount of said rubber latex used in the grafting step is from 30 to 80% by weight and preferably from 40 to 70% by weight based on the total amount of rubber latex and monomers used. The rubber latex should have more than 90% of gel content.

The amount of said vinyl cyanide compounds used in the grafting step is from 20 to 60% by weight and preferably from 20 to 40% by weight based on the total amount of monomers used. Examples of the vinyl cyanide compounds which can be used in this step include acrylonitrile, methacrlonitrile, etc.

The amount of said aromatic vinyl compounds used in the grafting step is from 40 to 80% by weight and preferably from 60 to 80% by weight based on the total amount of monomers used. Examples of said aromatic vinyl compounds which can be used in this step include styrene, α-methylstyrene, vinyltoluene, tert-butyl styrene, 3-ethyl styrene, etc.

The amount of the initiator used in the grafting step is preferably 0.1 to 0.5 parts by weight and more preferably 0.1 to 0.3% by weight based on the total weight of rubber latex and monomers used in the draft polymerization.

Examples of the initiator include peroxide compounds such as hydrogen peroxide, alkali metal persulphates such as sodium persulphate and potassium persulphate, ammonium persulphate, pivalates such as tert-butyl peroxiypivalate, perborates, peracetates, hydroperoxides such as cumene hydroperoxide, diisopropylbenzene hydroperoxide, paramenthane hydroperoxide or tert-butyl hydroperoxide, redox type catalysts which are formed by the combination of peroxides, for example as mentioned above, with reducing agents.

In the present invention, it is preferable to use a water-soluble hydroperoxides or alkali metal persulphates as the initiator. The solvent-soluble organic peroxides such as cumene hydroperoxide, diisopropylbenzene hydroperoxide as the initiator has the disadvantage of excess occlusion, and sulphate type compounds has the disadvantage of obtaining an insufficient degree of grafting. Therefore, it is most preferable to use tert-alkyl hydroperoxide as the initiator in the present invention because it has a medium water-solubility.

The reaction temperature can be selected from the temperature used in the conventional graft polymerization. However, the appropriate reaction temperature is from 50 to 85° C. and preferably from 60 to 70° C.

In the graft polymerization step of the present invention, it is possible to use other conventional additives such as emulsifiers, and chain transfer agents, etc.

The emulsifiers can be any surfactants, soaps or the like well known in the art. Examples of specific emulsifiers include alkyl sulphates, alkyl sulphonates, alkyl aryl sulphonates, α-olefin suphonates, quaternary ammonium salts, amine salts, fatty and rosin acid salts, polyoxyethylene alkyl or alkylaryl ethers and the like, and preferably alkali metal salt of rosin acid such as potassium salt of rosin and the like, alkali metal salts of fatty acids such as potassium oleate, sodium stearate and the like, and alkylarylsulphonate and the like. The alkyl portion of the various emulsifiers generally has from about 8 to about 18 carbon atoms.

Examples of chain transfer agents include mercaptans such as n-dodecyl mercaptan, tert-dodecyl mercaptan, isobutyl mercaptan, n-octyl mercaptan, isooctyl mercaptopropionate and the like, α-methylstyrene dimer, terpenes such as terpinolene, dipentene, t-terpene and the like, and halogenated hydrocarbons such as chloroform, carbon tetrachloride and the like.

In the graft copolymerization step, all the components can be added simultaneously or continuously. If continuously, the mixture of all the components may be divided into several portions with each portion being added continuously. Moreover, each portions can have the same or different composition.

By continuously, it means that the components or the mixture thereof are continuously added for a specified period. By simultaneously, it means that all the components or the mixture thereof are simultaneously added in one portion.

In the present invention, the graft copolymerization is conducted in two or three stages and the mixture of all the components was also divided into two or three portions with each portion being added either simultaneously or continuously. Further, each portion can have the same or different composition ratio.

When the graft copolymerization is conducted in three stages, all the components used in the first stage are added simultaneously to a reactor, and the components used in the second stage are added thereto together continuously. In the present invention, emulsifier, monomers and water are combined to form an emulsion and added continuously. The initiator is also added continuously.

In the third stage of the graft copolymerization, a small amount of initiator is further added in order to increase the conversion level and the reaction temperature is about 5° C. higher than that of the second stage.

The aromatic vinyl compounds and vinyl cyanide compounds used in the graft polymerization can be divided into two or three portions, one being added simultaneously and then the others being added continuously. Alternatively, two monomers may be added together continuously.

The portion which is added simultaneously and comprises said aromatic vinyl compounds and said vinyl cyanide compounds, has preferably the content of said vinyl cyanide compounds of 20 to 60% by weight and more preferably from 20 to 40% by weight based on the total amount of monomers used in this portion.

The graft copolymer finally obtained after either two or three stages of graft copolymerization is then coagulated by contacting with a salt solution ($AlCl_3$, $Al_2(SO_4)_3$ or $CaCl_2$) or aqueous sulphuric acid 5% solution, washed and dried to yield powdered graft copolymer. Other acids or methods can be used for the agglomeration.

The graft copolymer thus prepared can be melt and blended with styrene-acriylonitrile copolymer (SAN) to produce the final thermoplastic resin composition having a rubber content of 10 to 30% by weight.

BEST MODE FOR CARRYING OUT THE INVENTION

The following examples illustrate the present invention without limiting the scope of the present invention. The part and % used in the Examples are based on weight.

EXAMPLES

The determination of physical properties is carried out as follows:

A. Izod Impact Strength:

The Izod impact strength was determined in accordance with ASTM D-256. The thickness of test piece was ¼ inch.

B. Tensile Strength:

The tensile strength was determined in accordance with ASTM D-638.

C. Melt Flow Index (MI):

It was determined under the load of 10 kg at the temperature of 220° C. in accordance with ASTM D-1238.

D. Surface Gloss

It was determined at the angle of 60° in accordance with ASTM D-528. In addition, the surface gloss was also determined with a product injection molded after 10 minutes' aging in an injection molding machine.

E. The Degree of Grafting:

It was calculated according to the following equation after dissolving the resulted graft copolymer in acetone.

$$\text{Degree of grafting} = \frac{\text{the weight of } SAN \text{ grafted to rubber}}{\text{the weight of rubber}} \times 100$$

According to the present invention, the degree of grafting is preferably from about 20% to 35%. When the degree of grafting fall beyond this range, the impact strength tends to decrease.

F. Coagulum (%)

Coagulum (%) is a measurement of the non-usable polymeric solid formed during the graft copolymerization. It is the percent by weight based on the total weight of all components including monomers used. In the present invention, the weight percent of coagulum was determined after filtering the reaction mixture through 50 mesh and drying the coagulum.

In order to prepare test specimens used in the above determination, the graft copolymer was melt and blended with the SAN copolymer having about 130,000 of a weight average molecular weight and 24% of a acrylonitrile content. The resulted thermoplastic resin has 16% of the final rubber latex content. Then, the thermoplastic resin was molded by injection to produce the test specimens.

Example 1

A. Preparation of Small Rubber Latex Particles and Agglomeration Process

In a reactor, a mixture of 100 parts by weight of 1,3-butadiene, 3.3 parts by weight of potassium oleate as an emulsifier, 0.3 parts of potassium persulphate as an initiator, 0.2 parts by weight of tertiary dodecyl mercaptan, and 150 parts by weight of water were introduced. The mixture was heated to the temperature of 55° C. to carry out the polymerization for 1 hour. When the conversion reached 30%, 0.1 parts by weight of tertiary dodecyl mercaptan was further added to the reactor. The temperature of the reaction mixture was then raised to 60° C.

When the conversion reached 95%, diethylhydroxylamine was added to the reaction mixture to terminate the polymerization. The unreacted monomers were removed from the reaction mixture. The obtained rubber latex has an average particle diameter of 0.09 µm. a gel content of 90% and a swelling index of 15, which was used as the small rubber latex.

Using acid agglomeration method, the large rubber latex having an average particle diameter of 0.25 to 0.35 µm were prepared from the small rubber latex.

B. Preparation of Graft Copolymer

First Stage

TABLE 1

| component | parts by weight |
| --- | --- |
| small rubber latex | 5 |
| large rubber latex | 40 |
| potassium rosinate | 0.5 |
| water | 120 |
| styrene | 12.4 |
| acrylonitrile | 5.9 |
| t-dodecyl mercaptan | 0.2 |
| dextrose | 0.12 |
| tetrasodium pyrophosphate | 0.096 |
| ferrous sulphate | 0.0025 |
| t-butyl hydroperoxide | 0.05 |

The above components listed in Table 1 were simultaneously added to the reactor and the reaction mixture was heated to the temperature of 65° C. to carry out the first stage graft copolymerization for 1 hour.

Second Stage

TABLE 2

| component | parts by weight |
| --- | --- |
| styrene | 26.1 |
| acrylonitrile | 10.6 |
| t-dodecylmercaptane | 0.4 |
| potassium rosinate | 1.1 |
| water | 32 |

TABLE 2-continued

| component | parts by weight |
| --- | --- |
| dextrose | 0.153 |
| tetrasodium pyrophosphate | 0.123 |
| ferrous sulphate | 0.0032 |
| t-butyl hydroperoxide | 0.082 |

All of the components listed in Table 2 except the initiator solution are mixed to obtain an emulsion. This emulsion was continuously charged into the reactor for one and half hours, and the initiator solution was also continuously added thereinto for one and half hours. The reaction temperature was 65° C.

Third Stage

TABLE 3

| component | parts by weight |
| --- | --- |
| water | 27 |
| dextrose | 0.067 |
| tetrasodium pyrophosphate | 0.0533 |
| ferrous sulphate | 0.0014 |
| t-butyl hydroperoxide | 0.027 |

At the end of the second stage, all the components in Table 3 were added simultaneously into the reactor and the temperature was increased to 70° C. for 30 minutes. and the reaction was then terminated. At that time, the conversion reached 99%. After adding an anti-oxidant, an aqueous sulphuric acid 5% solution was added to coagulate the resulted graft copolymer latex. After washed and dried, the final powdery graft copolymer was obtained.

The graft copolymer was then compounded with SAN having a weight average molecular weight of about 130,000 and an acrylonitrile content of about 24%, a stabilizer and a lubricant to produce the thermoplastic resin composition of the present invention, and it was injection-molded. The final rubber content is about 16%. The physical properties are reported in the below Table 7.

Example 2

A. Preparation of Small Rubber Latex Particles and Agglomeration Process

According to the same procedure as in Example 1, the small rubber latex and then the large rubber latex were prepared, respectively.

B. Preparation of Graft Copolymer

First Stage

TABLE 4

| component | parts by weight |
| --- | --- |
| small rubber latex | 3 |
| the large rubber latex | 44 |
| potassium rosinate | 0.85 |
| water | 130 |
| styrene | 19.5 |
| acrylonitrile | 11.5 |
| t-dodecylmercaptane | 0.32 |
| dextrose | 0.255 |
| tetrasodium pyrophosphate | 0.204 |
| ferrous sulphate | 0.0053 |
| t-butyl hydroperoxide | 0.074 |

The rubber latex obtained from the above step A and other components as listed in Table 4 were added to a reactor simultaneously and the resultant mixture was heated to the temperature of 65° C. to carry out the first stage graft copolymerization for 1 hour.

Second Stage

TABLE 5

| component | parts by weight |
| --- | --- |
| styrene | 17.6 |
| acrylonitrile | 4.4 |
| t-dodecylmercaptane | 0.0 |
| potassium rosinate | 0.85 |
| water | 20 |
| dextrose | 0.085 |
| tetrasodium pyrophosphate | 0.068 |
| ferrous sulphate | 0.0018 |
| t-butyl hydroperoxide | 0.084 |

All the components listed in Table 2 were mixed to obtain an emulsion, which was continuously added for 1 hour to the reactor. The reaction temperature was 65° C.

Third Stage

According to the same procedure as specified in Example 1, the third stage graft copolymerization was conducted to obtain the final graft copolymer, which had the conversion of 98.8%.

The test specimens were prepared from the final graft copolymer according to the same procedure as in Example 1 and the physical properties are reported in Table 7

Example 3

A. Preparation of Small Rubber Latex Particles and Agglomeration Process

According to the same procedure as in Example 1, the small rubber latex and then the large rubber latex were prepared, respectively.

B. Preparation of Graft Copolymer

First Stage

According to the same procedure as in Example 2, the first stage graft copolymerization was conducted, except that 18.2 parts of styrene and 10.8 parts of acrylonitrile were used.

Second Stage

According to the same procedure as in Example 2, the second stage graft copolymerization was conducted, except that 16.8 parts of styrene and 4.2 parts of acrylonitrile were used.

Third Stage

According to the same procedure as in Example 2, the third stage was conducted.

The conversion of the final draft copolymer was 98.8%.

The test specimens were prepared from the final graft copolymer according to the same procedure as in Example 2 and the physical properties are reported in Table 7.

Example 4

A. Preparation of Small Rubber Latex Particles and Agglomeration Process

According to the same procedure as in Example 1, the large rubber latex was prepared.

B. Preparation of Graft Copolymer

First Stage

To a reactor containing 60 parts by weight of the large rubber latex prepared by the same procedure as in Example 1, an emulsion composed of all the rest components listed in below Table 6 was introduced to the reactor continuously for 2 hours and 30 minutes at the temperature of 65° C.

Second Stage

This step was not conducted.

Third Stage

According to the same procedure as in Example 1, the third stage was conducted to obtain the final graft copolymer which had the conversion of 98.5%.

An aqueous magnesium sulphate 25% solution was added to the resulted mixture to coagulate the graft copolymer. After the coagulated graft copolymer was extruded with SAN as specified in Example 1, the test specimens were prepared. The physical properties are reported in Table 7.

TABLE 6

| component | parts by weight |
| --- | --- |
| large rubber latex | 60 |
| potassium rosinate | 1.6 |
| water | 150 |
| styrene | 28 |
| acrylonitrile | 12 |
| t-dodecylmercaptane | 0.40 |
| dextrose | 0.33 |
| tetrasodium pyrophosphate | 0.27 |
| ferrous sulphate | 0.007 |
| t-butyl hydroperoxide | 0.13 |

Comparative Example 1

A. Preparation of Small Rubber Latex Particles and Agglomeration Process

In a reactor a mixture of 100 parts by weight of 1,3-butadiene, 3.3 parts by weight of potassium oleate as an emulsifier, 0.3 parts of potassium persulphate as an initiator, 0.2 parts by weight of tert-dodecyl mercaptan, and 150 parts by weight of water were introduced. The mixture was heated to the temperature of 55° C. to carry out the polymerization. When the conversion reached 40%, 0.2 parts by weight of linear alkyl mercaptan was further added to the reaction mixture and the temperature of the reaction mixture was raised to 60° C.

When the conversion reached 85%, diethylhydroxylamine was added to the reaction mixture to terminate the polymerization. The unreacted monomers were removed from the reaction mixture. Small rubber latex having an average particle diameter of about 0.09 $\mu$m, a gel content of about 80% and a swelling index of about 40 was thus obtained.

Using acid agglomeration method, the large rubber latex having an average particle diameter from 0.25 to 0.35 $\mu$m was prepared from the small rubber latex.

B. Preparation of Graft Copolymer

According to the same procedure as in Example 1, the graft copolymerization was conducted, except that small rubber latex having low gel content of about 80% and the large rubber latex prepared therefrom were used.

The conversion of the final graft copolymer was 99%.

The test specimens of the final graft copolymer were prepared according to the same procedure as in Example 1 and the physical properties are reported in Table 7.

Comparative Example 2

A. Preparation of Small Rubber Latex Particles and Agglomeration Process

According to the same procedure as in Example 1, the small rubber latex and then the large rubber latex were obtained, respectively.

B. Preparation of Graft Copolymer

According to the same procedure as in Example 1, the graft copolymerization was conducted, except that cumene hydroperoxide was used as an initiator instead of tert-butyl hydroperoxide.

First Stage

According to the same procedure as in Example 1, the first stage was conducted, except that 0.075 parts of cumene hydroperoxide was used as an initiator instead of tert-butyl hydroperoxide. The reaction mixture was heated to the temperature of 75° C. to carry out the polymerization for 1 hour.

Second Stage

According to the same procedure as in Example 1, the second stage was conducted, except that 0.15 parts of cumene hydroperoxide was used as an initiator instead of tert-butyl hydroperoxide and the emulsion was continuously added over 3 hours and 30 minutes.

Third Stage

According to the same procedure as in Example 1, the third stage was conducted, except that 0.05 parts of cumene hydroperoxide was used as an initiator instead of tert-butyl hydroperoxide. The reaction temperature was increased to 80° C. within 30 minutes and then gradually cooled down to 75° C. over 30 minutes to terminate the polymerization.

The conversion of the final graft copolymer was 98%.

The test specimens were prepared from the final graft copolymer according to the same procedure as in Example 1 and the physical properties are reported in Table 7.

Comparative Example 3

A. Preparation of Small Rubber Latex Particles and Agglomeration Process

According to the same procedure as in Example 2, the small rubber latex and then the large rubber latex were obtained, respectively.

B. Preparation of Graft Copolymer

The same procedure as in Example 2 was used except that cumene hydroperoxide was used as an initiator instead of tert-butyl hydroperoxide in the amount of 0.128 parts (first stage), 0.09 part (second stage) and 0.05 part (third stage) by weight, respectively. The graft polymerization was carried out according to the same procedure as specified in comparative Example 1.

The conversion of the final graft copolymer was 98.5%.

The test specimens were prepared from the final graft copolymer according to the same procedure as in Example 1 and the physical properties are reported in Table 7.

Comparative Example 4

A. Preparation of Small Rubber Latex Particles and Agglomeration Process

According to the same procedure as in Example 4, the large rubber latex was prepared.

B. Preparation of Graft Copolymer

First Stage

According to the same procedure as in Example 4, the first stage was conducted, except that 0.2 parts of cumene hydroperoxide was used as an initiator instead of tert-butyl hydroperoxide and the mixed emulsion was continuously added to the reactor over 4 hours.

Second Stage

This step was not conducted.

Third Stage

According to the same procedure as in Example 4, the third stage was conducted except that 0.05 parts of cumene hydroperoxide was used as an initiator instead of tert-butyl hydroperoxide. The reaction temperature was increased to 80° C. within 30 minutes and then gradually cooled down to 75° C. over 30 minutes to terminate the polymerization.

By using aqueous magnesium sulphate 25% solution, the graft copolymer was coagulated. After that, the same procedure in Example 4 was carried out. The physical properties are reported in Table 7.

TABLE 7

|  | Example 1 | Example 2 | Example 3 | Example 4 | Comparative Example 1 | Comparative Example 2 | Comparative Example 3 | Comparative Example 4 |
| --- | --- | --- | --- | --- | --- | --- | --- | --- |
| Izod impact strength[a] (kg · cm/cm) | | | | | | | | |
| 20 °C. | 30 | 34 | 32 | 30 | 23 | 22 | 25 | 26 |
| −20 °C. | 15 | 16 | 15 | 15 | 13 | 13 | 14 | 16 |
| Melt flow rate[a] (MI) (g/10 min) | 21 | 22 | 21 | 18 | 20 | 22 | 20 | 21 |
| Tensile strength[a] (kg/cm$^2$) | 500 | 498 | 489 | 460 | 500 | 510 | 500 | 440 |
| Surface gloss[a] (%) (aged for 10 min) | 98.5 (95) | 99 (96) | 96 (92) | 98.5 (89) | 98 (95) | 98 (95) | 97 (95) | 96 (90) |
| degree of grafting[b] (%) | 26 | 24 | 22 | 22 | 36 | 45 | 43 | 42 |
| conversion rate[b] (%) | 99 | 98.8 | 98.8 | 98.5 | 99 | 98 | 98.5 | 98.5 |
| Total reaction time[b] (hours) | 3.0 | 2.5 | 3.0 | 3.0 | 3.0 | 5.5 | 5.5 | 5.0 |
| Coagulum[b] (%) | 0.02 | 0.03 | 0.03 | 0.05 | 0.08 | 0.1 | 0.1 | 0.12 |

Note:
[a]The properties are based on the thermoplastic resin composition having the graft copolymer prepared in each Example;
[b]The properties are based on the graft copolymer prepared in each Example.

INDUSTRIAL APPLICATION

The method of producing a thermoplastic resin according to the present invention can produce a graft copolymer having a very high impact strength and good surface gloss with greatly improved processability. Using the method of the present invention, the inner occlusion into the resin is decreased and the degree of surface grafting is increased.

Further, the graft copolymer prepared in the present invention can be melt and blended with a conventional thermoplastic resin to obtain a thermoplastic resin composition having high impact strength and good surface gloss.

What is claimed is:

1. A process for producing a thermoplastic resin comprising graft polymerizing for less than about 3 hours 20 to 60% by weight of at least a vinyl cyanide compound and 40 to 80% by weight of at least an aromatic vinyl compound, based on the total amount of monomers, in the presence of 30 to 80% by weight of a rubber latex mixture and a water-soluble initiator, said rubber latex mixture having a gel content of from 90 to 100% and comprising a small rubber latex having an average particle diameter from 0.07 to 0.15 μm and a large rubber latex having an average particle diameter of 0.25 to 0.35 μm.

2. The process according to claim 1 wherein said rubber latex mixture comprises less than 20% by weight of said small rubber latex.

3. The process according to claim 1 wherein said rubber latex is selected from polybutadiene and a copolymer of butadiene with at least a comonomer in which the content of butadiene is more than 50% by weight and the comonomer is selected from styrene, α-methylstyrene, vinyltoluene, acrylonitrile and methacrylonitrile.

4. The process according to claim 1 wherein said aromatic vinyl compound is at least a compound selected from styrene, α-methylstyrene and vinyltoluene, and said vinyl cyanide compound is at least a compound selected from acrylonitrile and methacrylonitrile.

5. The process according to claim 1 wherein said aromatic vinyl compounds and said vinyl cyanide compounds used in graft polymerization are divided into two or three portions, one portion being added simultaneously and then the other portions being added continuously, or both monomers being added together continuously.

6. The process according to claim 5 wherein said one portion that is added simultaneously and comprises said aromatic vinyl compounds and said vinyl cyanide compounds contains 20 to 60% by weight of said vinyl cyanide compounds based on the total amount of monomers in this portion.

7. The process according to claim 1 wherein said water-soluble initiator is selected from potassium persulphate, sodium persulphate, ammonium persulphate and tert-alkyl hydroperoxide.

8. The process according to claim 1 wherein the reaction temperature of graft polymerization is from 50° C. to 85° C.

9. The process according to claim 6 wherein said one portion that is added simultaneously and comprises said aromatic vinyl compounds and said vinyl cyanide compounds contains 20 to 40% by weight of said vinyl cyanide compounds based on the total amount of monomers in this portion.

10. The process according to claim 8 wherein the reaction temperature of graft polymerization is from 60° C. to 70° C.

11. A process for producing a thermoplastic resin comprising graft polymerizing for less than about 3 hours 20 to 60% by weight of at least a vinyl cyanide compound and 40 to 80% by weight of at least an aromatic vinyl compound, based on the total amount of monomers, in the presence of 30 to 80% by weight of a rubber latex mixture and tert-alkyl hydroperoxide as a water-soluble initiator, said rubber latex mixture having a gel content of from 90 to 100% and comprising a small rubber latex having an average particle diameter from 0.07 to 0.15 μm and a large rubber latex having an average particle diameter of 0.25 to 0.35 μm.

* * * * *